US011526492B2

(12) United States Patent
Khan et al.

(10) Patent No.: US 11,526,492 B2
(45) Date of Patent: Dec. 13, 2022

(54) SORTED INSERTION IN DATABASES

(71) Applicant: HEWLETT PACKARD ENTERPRISE DEVELOPMENT LP, Houston, TX (US)

(72) Inventors: Aslam Khan, Santa Clara, CA (US); Michael Zayats, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 91 days.

(21) Appl. No.: 16/147,818

(22) Filed: Sep. 30, 2018

(65) Prior Publication Data
US 2020/0104394 A1    Apr. 2, 2020

(51) Int. Cl.
*G06F 16/27* (2019.01)
*G06F 16/23* (2019.01)
*G06F 16/22* (2019.01)

(52) U.S. Cl.
CPC ...... *G06F 16/2379* (2019.01); *G06F 16/2282* (2019.01); *G06F 16/27* (2019.01)

(58) Field of Classification Search
CPC .. G06F 16/27; G06F 16/2282; G06F 16/2379; G06F 17/30
USPC .......................................................... 707/741
See application file for complete search history.

(56) References Cited

U.S. PATENT DOCUMENTS

| 5,809,501 | A | 9/1998 | Noven | |
| 7,263,536 | B1 * | 8/2007 | Pederson | G06F 16/2228 |
| 7,895,216 | B2 | 2/2011 | Longshaw et al. | |
| 9,251,155 | B1 | 2/2016 | Galimberti et al. | |
| 9,734,176 | B2 | 8/2017 | Bestgen et al. | |
| 2006/0004745 | A1 * | 1/2006 | Kuhn | G06Q 10/10 |
| 2007/0208805 | A1 * | 9/2007 | Rhoads | G06F 16/381 |
| | | | | 709/203 |
| 2010/0174748 | A1 * | 7/2010 | Strumpf | G06F 16/20 |
| | | | | 707/780 |
| 2012/0011096 | A1 * | 1/2012 | Aggarwal | G06F 16/2379 |
| | | | | 707/602 |
| 2013/0166522 | A1 * | 6/2013 | Kaufmann | G06F 16/2477 |
| | | | | 707/695 |
| 2014/0082008 | A1 * | 3/2014 | Johnson | H04W 84/18 |
| | | | | 707/758 |
| 2017/0139909 | A1 * | 5/2017 | Karri | G06F 16/164 |
| 2019/0179668 | A1 * | 6/2019 | Wang | H04L 45/74 |

(Continued)

OTHER PUBLICATIONS

Allen Wyatt in "Automatically Sorting as you Enter Information" Sep. 18, 2018 10 pages.

(Continued)

*Primary Examiner* — Hicham Skhoun
(74) *Attorney, Agent, or Firm* — Nolte Intellectual Property Law Group

(57) ABSTRACT

A method of providing data stored in a network device to a subscriber, the method including providing a central database including data stored in a table, maintaining a sorted list for the table in the publisher, and generating a modification and a modification identifier for the table with the publisher. The method further including inserting the modification into the table in the central database based on the modification identifier, receiving a command from the subscribed for the table, and providing the table to the subscriber from the central database.

19 Claims, 7 Drawing Sheets

(56) References Cited

U.S. PATENT DOCUMENTS

2020/0125584 A1* 4/2020 Barry .................. G06F 16/2365

OTHER PUBLICATIONS

Extended European Search Report received for EP Patent Application No. 19198329.5, dated Jan. 3, 2020, 07 pages.
Wikipedia, "Linked List," Aug. 27, 2018, https://web.archive.org/web/20180827154939/https://en.wikipedia.org/wiki/Linked_list.

* cited by examiner

SORTED INSERTION IN DATABASES

BACKGROUND

Network devices, such as switches, are used to connect other devices, such as servers, other switches, or compute modules, to create a network within a data center. The switches allow for the sharing of resources, serving as a controller, thereby allowing devices on the network to share information and otherwise communicate. During operation, switches and other network devices have various configurations and statuses that are stored in central databases in the form of tables. Subscribers may request information stored in the tables in order to monitor or configure the operability of the network devices.

BRIEF DESCRIPTION OF THE DRAWINGS

Examples described herein may be understood by reference to the following description taken in conjunction with the accompanying drawings, in which like reference numerals identify like elements.

Figure 1:
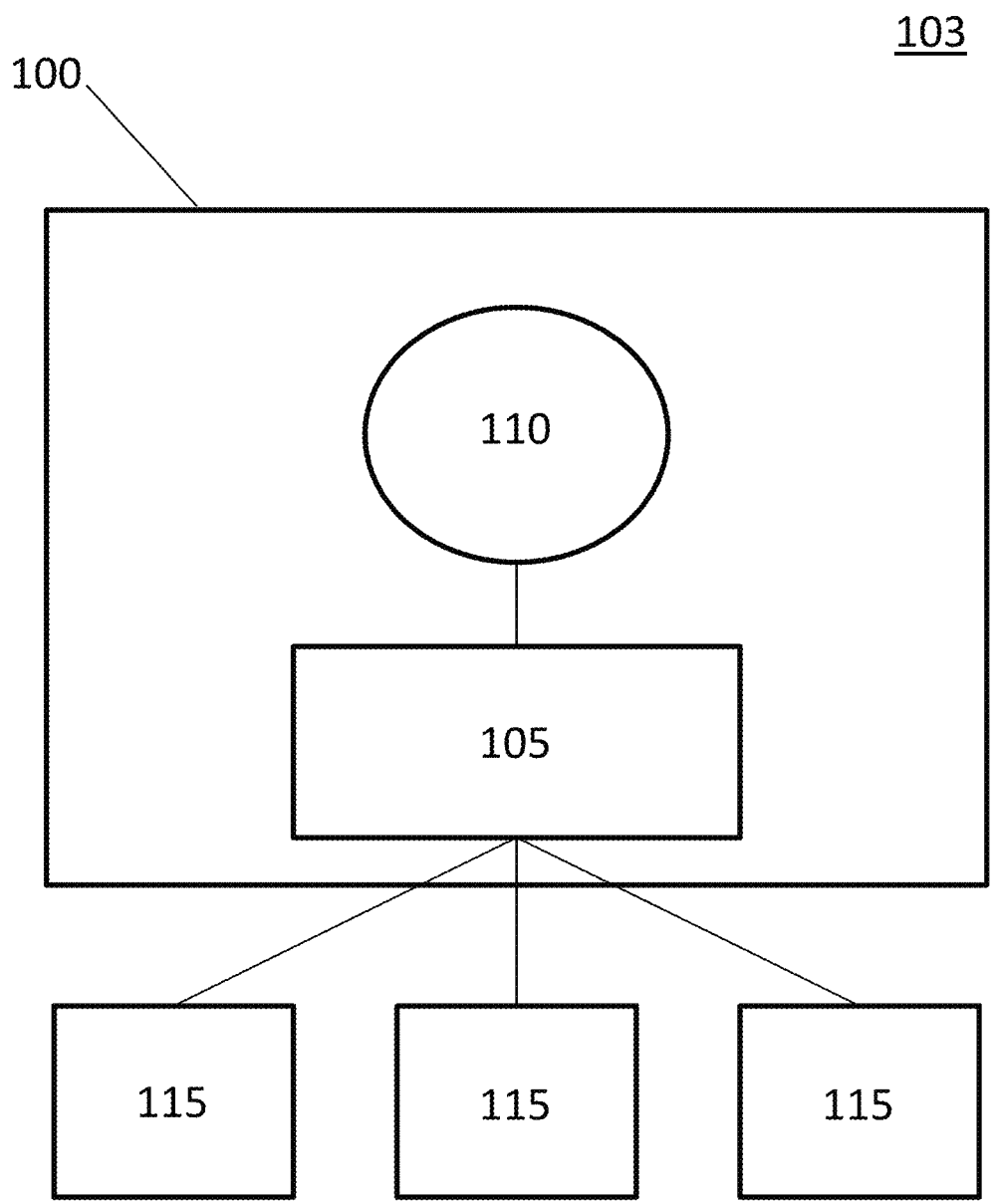
FIG. 1 is a schematic representation of a network system to provide data to subscribers in accordance with one or more example embodiments.

While examples described herein are susceptible to various modifications and alternative forms, the drawings illustrate specific embodiments herein described in detail by way of example. It should be understood, however, that the description herein of specific embodiments is not intended to be limiting to the particular forms disclosed, but on the contrary, the intention is to cover all modifications, equivalents, and alternatives falling within the spirit and scope of the examples described herein and the appended claims.

DETAILED DESCRIPTION

One or more examples are described in detail with reference to the accompanying figures. For consistency, like elements in the various figures are denoted by like reference numerals. In the following detailed description, specific details are set forth in order to provide a thorough understanding of the subject matter claimed below. In other instances, well-known features to one of ordinary skill in the art having the benefit of this disclosure are not described to avoid obscuring the description, of the claimed subject matter.

In the field of network computing, network connectivity between devices, compute nodes, blades, or frames of a scalable computing resource may be implemented using a network communication device. Network communication devices, such as switches, routers, hubs, bridges, etc. represent a primary communication path for sharing data between different types of computing resources generically referred to as "nodes" of a network. The shared data may represent inputs to computing processes (e.g., data or applications), outputs of computing resources (e.g., compute results), communications to coordinate distributed processes, communications between users, and other types of data.

In any "intelligent" network communication device there may be a processor, local memory, configuration information, and "current state" information, among other types of information. Collectively, the different types of information on a network communication device may be considered to represent the overall "device state" at a given point in time. For example, information on a network communication device (including its "device state") is expected to change over time, in part because while in-service and providing active communication paths for a network, the overall configuration and available devices on that network may change. In particular, routing information may change as devices become available or unavailable at different points in the overall network (e.g., a laptop device relocating). Information in routing tables and overall network connectivity may represent a portion of the device state of a network communication device.

In general, a switch may be thought of as a device in a computer network that connects together other devices ("nodes" of the network). Multiple data cables may be plugged into a switch to enable communication between different networked devices. Switches manage the flow of data across a network, typically by transmitting a received, network packet only to the one or more devices for which the packet is intended. Each networked device connected to a switch can be identified by its network address, allowing the switch to direct the flow of traffic, possibly in an effort to maximize the security and efficiency of the network. A switch is more intelligent than a hub (e.g., Ethernet hub), which simply retransmits packets out of every port of the hub except the port on which the packet was received. In most cases, a hub is unable to distinguish different recipients, and therefore may have an overall lower network efficiency, but simpler configuration information, than a switch/router. Generally, a router is a networking device that forwards data packets between computer networks. Routers perform the traffic directing functions on the Internet. A data packet is typically forwarded from one router to another router through the networks that constitute an internetwork until it reaches its destination node.

As explained further below, some network communication devices are "hybrid" devices in that they perform more than one classification of service. That is, some switches may also be routers and some routers may also be switches and have hubs as part of their architecture. Accordingly, there are a variety of network communication devices (commonly referred to as switches, hubs, routers, etc.) that may benefit from the concepts of this disclosure. Generally, embodiments of the present disclosure may provide systems and methods for the remote monitoring of network communication devices as well as remote fault analysis for such network communication devices. Such monitoring may include real time monitoring for troubleshooting and/or fault analysis as well as passive monitoring that may allow data to be accumulated over time to facilitate performance and use monitoring.

Network communication devices, such as switches, routers, and the like may be housed in data centers and may be used to connect servers and other computing devices within the data center. Monitoring of such network communication devices may require the manual connection of a user-specific data collection mechanism, such as cables, thereby allowing users to individually collect data from specified network communication devices. Other methods of monitoring and collecting data may include collecting switching device statistics from specified devices within the data center and then caching the collected data within the data center. Such systems include in data center computing and storage resources to cache and process the collected data. However, such solutions do not provide for monitoring or performing fault analysis on switching devices distributed over multiple data centers. In order to collect and collate data from multiple data centers, in data center computing and storage solutions are installed in each data center.

Switches, along with other network devices, may be monitored by users/clients in order to access the operability of the devices. The monitoring of the devices occurs by the user/client requesting data stored in the form of tables on central databases connected or otherwise integrally a part of specific network devices. The tables include various information about the switch, including, for example, protocols for network layers, processes, functionality data, and the like. The tables may include numerous columns and rows, which allow the user/client to select specific information about the devices. Depending on the complexity of the device, a table for a specific device may have hundreds of thousands or even millions of columns and/or rows.

When a user/client requests information about a device, the entire table is downloaded to the user/client, the user/client must then sort the information provided in the tables. Due to the size of the tables, as indicated above, sorting the data may be resource intensive, thereby requiring increased computing power and memory. This problem may be multiplied, as more than one user/client may request information at the same time. Thus, a network device may be required to provide unique datasets, stored as tables, containing vast amounts of data that requires sorting before each user/client can functionally use the data provided in the tables.

Systems and methods discussed herein may provide users/clients the ability to access sorted tables that are stored in central databases of specific network devices. As a publisher makes a modification to a table, the publisher provides the database a modification identifier that tells the database where to insert the modification within the table. When a user/client requests access to the data, the data stored in the central, database is delivered with the modifications to the table positioned in the table in a correct location. The table with modifications inserted in the correct location may thereby allow the user/client to access all or a portion of the data without requiring the resource intensive step of sorting the data. By decreasing the amount of sorting that is undertaken by individual users/clients, system resources may be saved, thereby increasing the efficiency of a network system.

Turning to FIG. 1, a schematic representation of a network system to provide sorted data to subscribers according to one or more embodiments is shown. In this implementation, a network device 100, such as, for example, a switch, is provided. In such a network system 103, multiple switches may also be connected together through, an aggregation switch. Accordingly, network device 100, in certain implementations may be an aggregation switch. Network device 100 includes a central database 105. The central database 105 may be stored in memory (not otherwise shown) within network device 100 or may be stored in external memory that is connected to network device 100.

During operation, network device 100 may run or otherwise employ various protocols and processes. For example, certain network devices 100 may employ various network layer protocols, such as layer 2 and layer 3 protocols, thereby enabling the sending of packets of data between different switch ports or to different internet protocol addresses within a network. The configuration and operation, of network device 100 may be recorded and stored in central database 105. The data stored in central database 105 may include configuration data, run time schedules, operational information, and/or any other data that may be accessed by a subscriber to analyze, debug, or otherwise monitor specific network devices 100.

The data stored in central database 105 may be stored in table format, as will be discussed in detail below in detail with respect to FIGS. 3 and 4. Generally, the tables may include columns and rows forming individual blocks in which certain information is stored. In certain implementations, columns may include a specific class of information and the corresponding row may include data related to the defined information class. Accordingly, a client, in reviewing a table, may select a type of information defined by the column and then find a desired value by matching the column with a specific row. The data provided to the client may then be used to monitor and/or configure specific network devices 100. In this implementation the client is a subscriber interface software process, herein referred to as subscriber 115. As illustrated, multiple subscribers 115 may have access to the data stored in central database 105.

A publisher 110 may also be operatively connected to network device 100. The publisher 110 may be a software process/service on a particular network device 100. The publisher 110 may make modifications to the tables stored in central database 105. For example, during operation, the publisher 110 may modify a table by adding rows to the table. The modification may occur in order to add new information to the table, to reconfigure a network device 100, or to otherwise generate or store additional data. When the modification is sent from publisher 110 to central database 105, the modification is sent with a modification identifier that provide a relative location for insertion/modification with the table. Accordingly, when central database 105 receives the modification and modification identifier, the central database 105 can insert the modification into the correct positional location with the table.

In such a system, multiple publishers 110 may operate on network device 100 at the same time. As, updates to the tables occur, updated tables may be stored in central database 105. Accordingly, real-time or substantially real-time updated tables may be available within central database 105. The tables may include hundreds of thousands or even millions of rows. Because publisher 110 provides a modification identifier when the modifications to the tables are sent to the central database, the central database 105 may provide subscribers access to data, without requiring the subscribers to independently sort the tables prior to use.

The subscribers 115 may include an interface software process that monitors the network device 100 in order to determine the operational condition of the network device 100. To enable monitoring of network device 100, subscribers 115 may access central database 105 and download the stored tables. The downloaded tables may then be reviewed/ used by the subscribers 115. To access the tables, a subscriber 115 may submit a command, such as a "show command", thereby causing data from central database 105 to be sent to the subscriber 115 for use. The data, such as data stored in a table, may include a sub-set of data that is unique for a specific subscriber 115. For example, not all subscribers 115 may have access to all data stored in a particular table. In such a situation, the subscriber 115 may submit a show command for a desired subset of data that may be defined by a range of columns 155 and rows. In other implementations, subscribers 115 may have access to the totality of the data stored in the tables.

Figure 2:
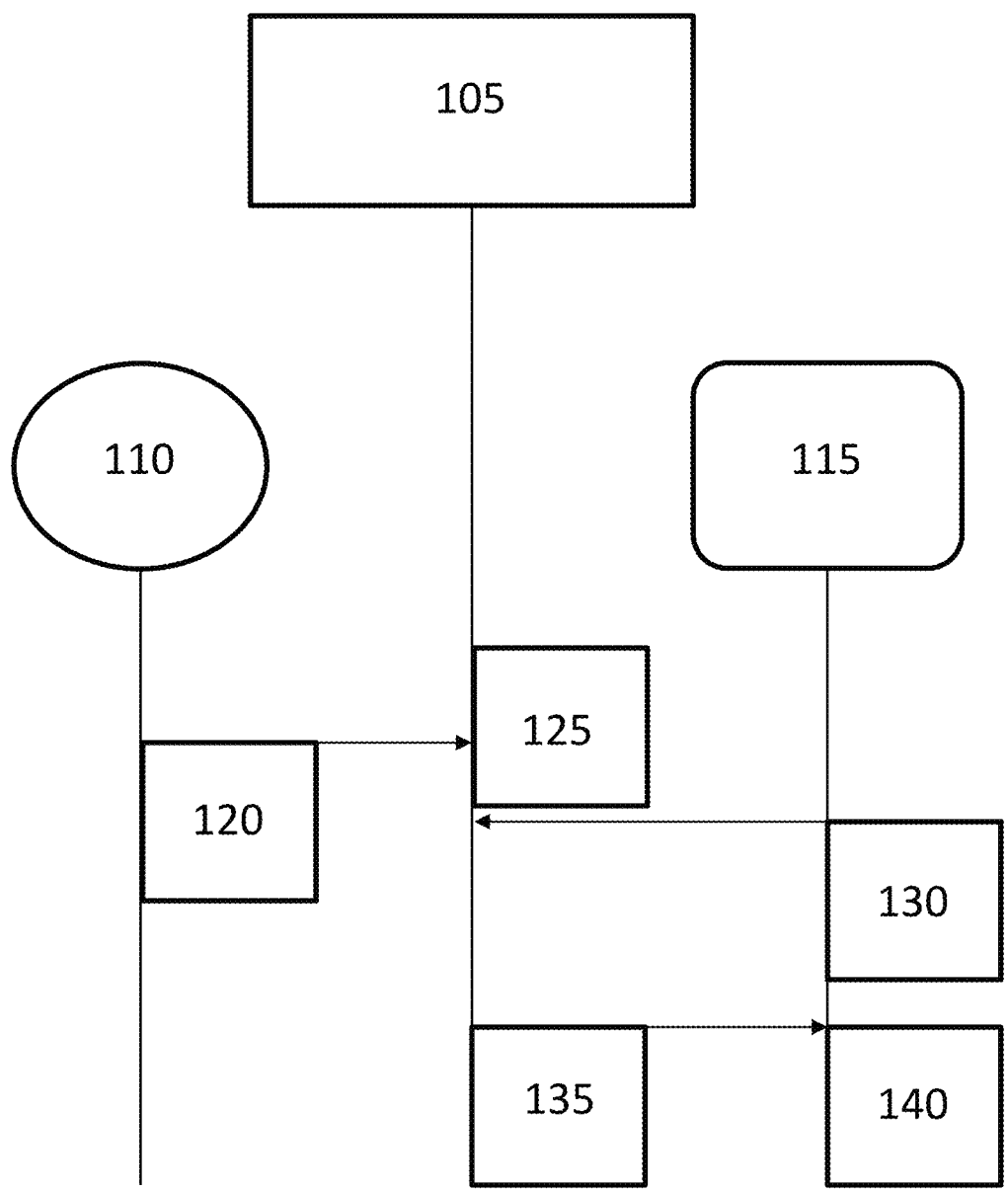
FIG. 2 is an operational schematic for providing data to subscribers in accordance with one or more example embodiments.

Turning to FIG. 2, an operational schematic for providing data to subscribers according to one or more embodiments is shown. During operation of network devices (100 of FIG. 1), one or more subscribers 115 may request data from a central database 105, as described above. A publisher 110 may also be creating, adding, or otherwise modifying information in tables that are stored in the central database 105, which is being accessed by the individual subscribers 115.

In an example implementation, the publisher 110 may insert (120) a new row into a table. When the row is sent to central database 105, publisher may associate the row with a modification identifier. The modification identifier may associate the row with an existing row within the table. When central database 105 receives the new row, the modification identifier tells the central database 105 where to insert the row within table. For example, the new row may include a modification identifier that indicates it should be located after existing Row A within the table. When central database 105 receives the row, central database 105 may perform a hash lookup to find Row A, and insert the new row after Row A. Because the row is inserted in the table in the central database 105 at the correct location, as subscribers 115 access the table, the subscribers 115 will have access to a table that does not require sorting. As such, individual subscribers 115 do not have to sort the table prior to using the data stored therein.

To maintain the table in central database 105, the central database 105 may maintain (125) a linked-list data structure of the sorted rows. Accordingly, as the publisher 110 modifies the table, the table is continuously updated with modifications inserted in the correct location within the table. The modified sorted table may thus be substantially continuously updated for access by individual subscribers 115.

During operation, a subscriber 115 may request (130) particular rows from a large table stored in the central database 105. Additionally, the subscriber 115 may request (130) a sub-set of data, such as a particular number of columns and rows from the table. In an unsorted table, the table would first have to be sorted to take into consideration modifications to the table by publisher 110. However, because the table stored in central database 105 maintains (125) a sorted structure, the request for data from the table may be provided without the requirements for individual sorting.

After the subscriber 115 request (130) for a particular dataset from central database 105, the central database 105 replies (135) by providing the rows from the linked-listed table. The subscriber 115 may then receive (140) the requested (130) data in a sorted format, thereby allowing the subscriber 115 to view the data without first sorting the data.

Figure 3:
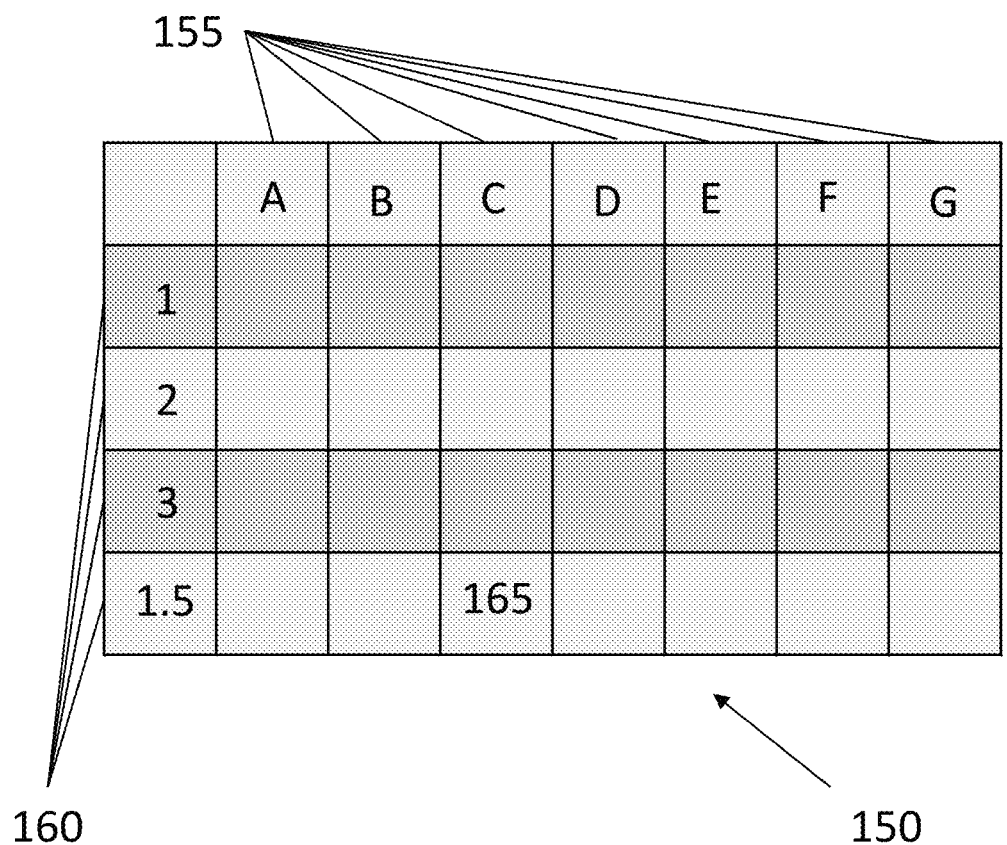
FIG. 3 is an illustrative representation of a table that may be provided to subscribers in accordance with one or more example embodiments.
Figure 4:
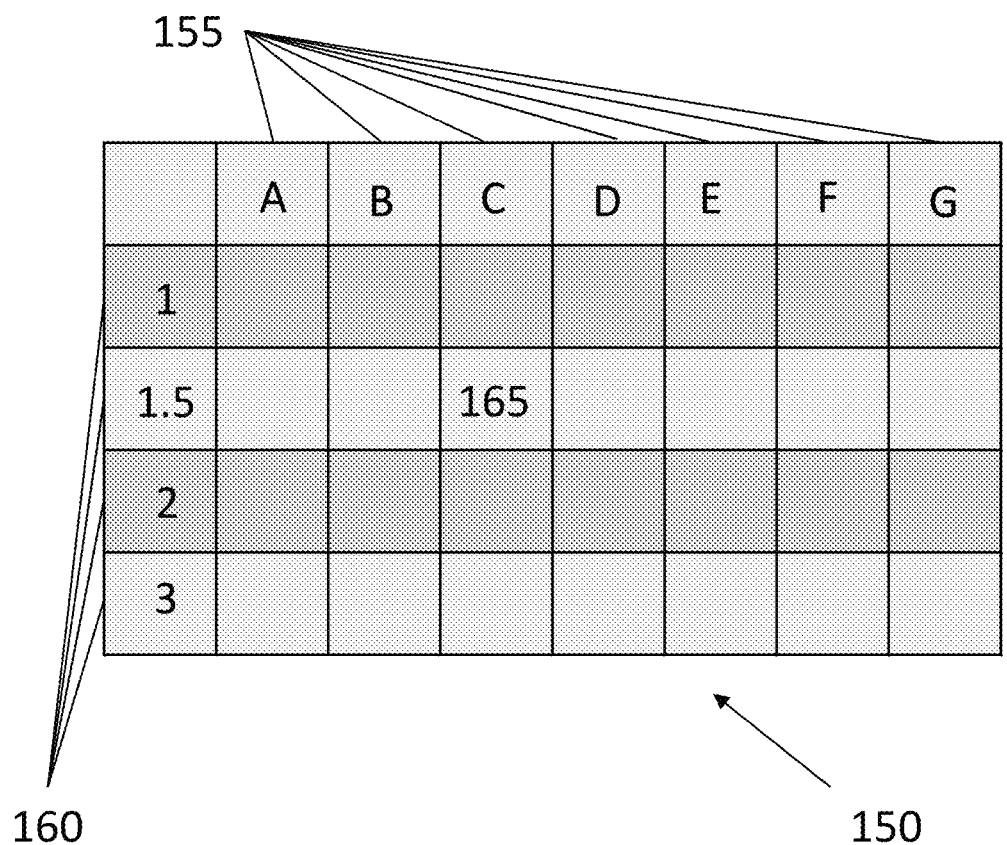
FIG. 4 is an illustrative representation of a sorted modified table that may be provided to subscribers in accordance with one or more example embodiments.

Turning to FIGS. 3 and 4 together, an illustrative representation of a table that may be provided to subscribers according to one or more embodiments is shown. FIG. 3 shows table 150 after modification when a modification identifier is not used. FIG. 4 shows table 150 after modification and using a modification identifiers. As, discussed above, table 150 may be stored in a central database (105 of FIG. 1) within a network device (100 of FIG. 1). The table 150 may include numerous columns 155 and rows 160. For example, certain tables 150 may have hundreds or even thousands of columns 155 and hundreds of thousands or even millions of rows 160. For clarity, a truncated table 150 is provided herein for illustrative purposes.

Prior to modification, table 150 may include rows 160 numbered 1, 2, and 3. Similarly, table 150 may include columns 155, identified as A-G. A publisher (110 of FIG. 1) may modify table 150 by adding a row 160, such as row 160 identified as 1.5. Row 1.5 may be added at the end of the table 150, as is shown here, or may be, randomly inserted within table 150.

When a modification identifier is not used when modifying table 150, the data contained in, for example, box 165, is out of order. Accordingly, a subscriber would be required to sort the data so that the information in box 165 would be appropriately located prior to reviewing the data. Sorting table 150 prior to every review may increase computing and memory resource requirements, slowing computing and network systems and decreasing the efficiency of the process.

Referring specifically to FIG. 4, table 150 is shown after when the table is modified using a modification identifier is provided. Accordingly, row 1.5 is located between rows 1 and 2, and as such, box 165 including data stored therein is located in the correct positional location within table 150. Table 150 may be substantially continuously updated within the central database. As subscribers request information, from table 150, the sorted modified table 150 may be provided without the need for additional sort functions by the central database or by the individual subscribers.

Figure 5:
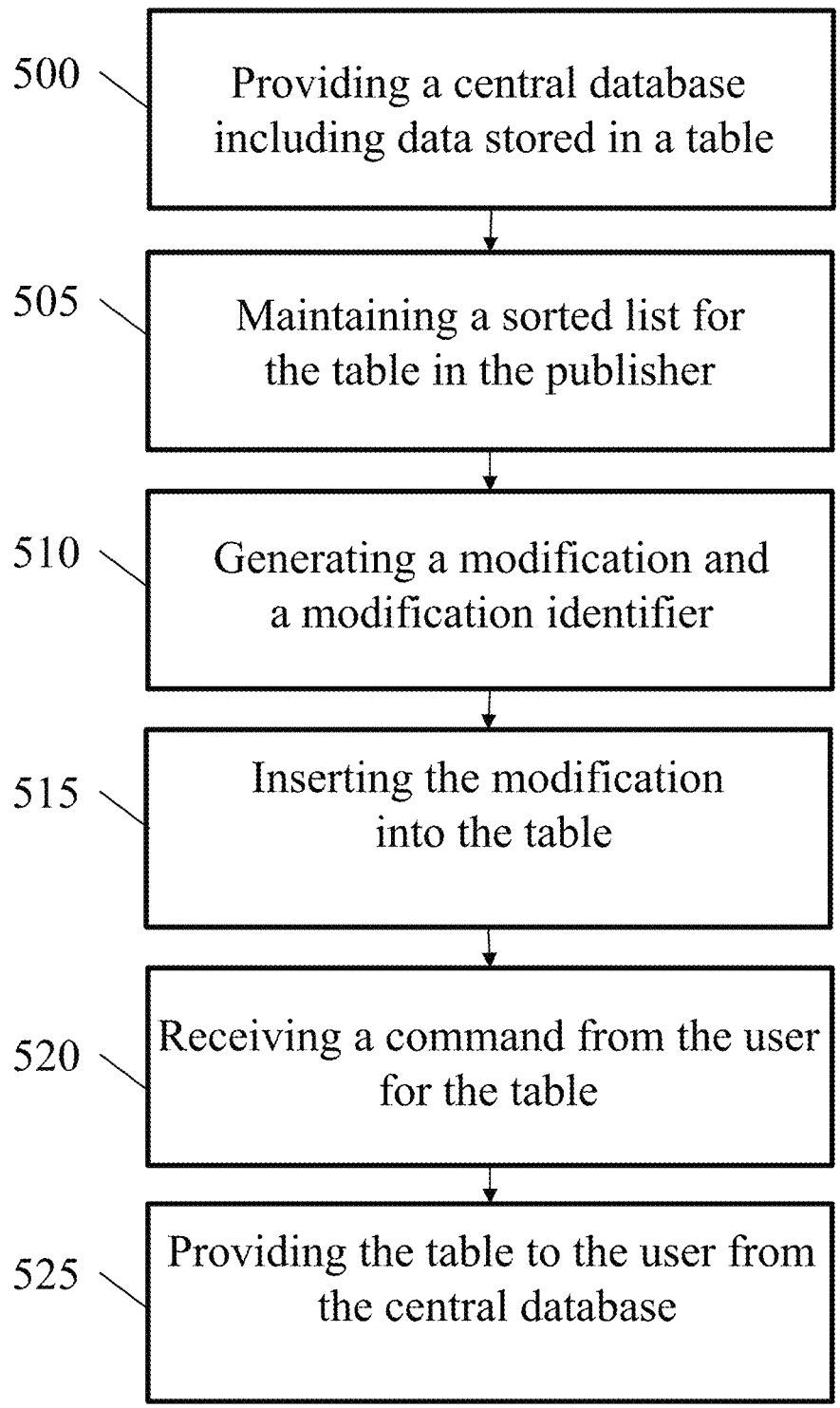
FIG. 5 is a flowchart of a method for providing data to subscribers in accordance with one or more example embodiments.

Turning to FIG. 5, a flowchart of a method for providing data to subscribers in accordance with one or more embodiments is shown. As explained above, a network device, such as a computing system or a switch, may be provided (500), which includes a central database. The central database may be used to store information about the network device, such as device configurations, operational data, protocols, services runtime schedules, and the like. This information may be stored as data with tables. As previously discussed, the tables may be relatively large, containing hundreds of thousands or millions or columns and rows, thereby making the datasets contained therein occupy substantial memory.

A network device may also include one or more publishers. Publishers are the software process/services on the network device. Publishers may be used to modify tables in the central database such as by adding or inserting new rows within a table. In order to modify the table, and insert the modifications within a correct positional location within the table, the publisher may maintain (505) a sorted list for the table. The sorted list may provide the publisher with relative locational information for individual aspects of the table. For example, the sorted list may provide the publisher with information about how specific rows, columns, and boxes are located relative to each other. The sorted list may use a linked-list structure, as discussed above.

During operation, publisher may generate (510) a modification and a modification identifier for the table. As previously discussed, the modification may include the addition of a row, a column, or another change to the data or data structure within, the table. In addition to a modification, publisher may generate (510) a modification identifier that is associated with the specific modification. The modification identifier may include information about where the modification should be inserted within the table.

For example, when the publisher wants to add the modification, such as a new Row Y, to the table, the publisher may first add new Row Y to its local sorted data structure. With this addition, the publisher knows that new Row Y will come after an existing Row X. Then publisher may then send a request to the central database to add/insert new Row Y to the table, along with the modification identifier indicating that new Row Y should be inserted after existing Row X. The database then stores new Row Y and also adds it to simple linked-list of sorted rows after Row X. Whenever the database gets subscriber requests to send rows from this table as part of a show command, the database will return the rows one by one walking through its linked-list which is arranged in a sorted order.

In order to add the modification to the table, the publisher may send the generated modification with the modification identifier to the central database. Upon receiving the modification and modification identifier, the central database may insert (515) the modification into the table based on the modification identifier. For example, when the modification is a new row, the publisher may send the row to the central database and the central database may insert the row into the table according to the positional information provided by the modification identifier. Thus, when the new row is added, the new row is associated by the publisher with an existing row in the table, due to its linear correlation, and the new row is inserted within the table at its correct positional location.

During operation, a subscriber may require information from the network device. The subscriber may submit a request for information. The submitted request may be received (520) by the network device. The network device may the access the central database and provide (525) the requested information to the subscriber. In this implementation, the network device receives (520) a command from the subscriber requesting data in the table. The data may include the entire table or may include a sub-set thereof. For example, in certain, implementations, the subscriber may request data that is stored in a sub-set of boxes within the table, (e.g., a range of columns or row).

Alternatively, the subscriber may request all or a subset of row associated with a particular column. In either situation, if the rows were inserted at the correct location within table prior to the subscriber request, the subscriber would be required to sort, the rows prior to using the information. Such individualized requests and subsequent sort functions may decrease available system resources, thereby slowing system performance and decreasing network efficiently. Additionally, such individualized sort functions may cause the debugging of system errors to take longer to correct.

In certain implementations, methods disclosed herein may further include receiving a second command from a second subscriber. The second command may request access to particular rows associated with one or more columns of the table. Because the rows are in the correct location, the second subscriber does not have to perform an additional sort function on the table stored in the central database. Accordingly, the network device may provide the table, or the requested sub-set thereof, to the second subscriber from the central database.

In other implementations, the method may further include modifying the table with a second publisher. In such circumstances, a network device may have more than one publisher modifying the tables of a particular network device. Upon modification, the modification may be inserted (151) into the table in the correct location. As multiple publishers may be adding data independently, the table may be maintained in a sorted form. Allowing multiple publishers to work together while saving (515) respective modifications to the table in the central database may thereby provide tables that do not require sorting, to one or more subscribers.

In submitting commands to the network device, the subscribers may submit various requests. In certain implementations, subscribers may submit show commands. A show command instructs the network device to send the table or a sub-set of the table containing certain values to the subscriber. Upon providing the requested data, the data may be used by the subscriber. In other situations, the subscriber command may include a configure command. Upon receipt of the configure command the subscriber may be provided data and subsequently modify such data in the table.

Figure 6:
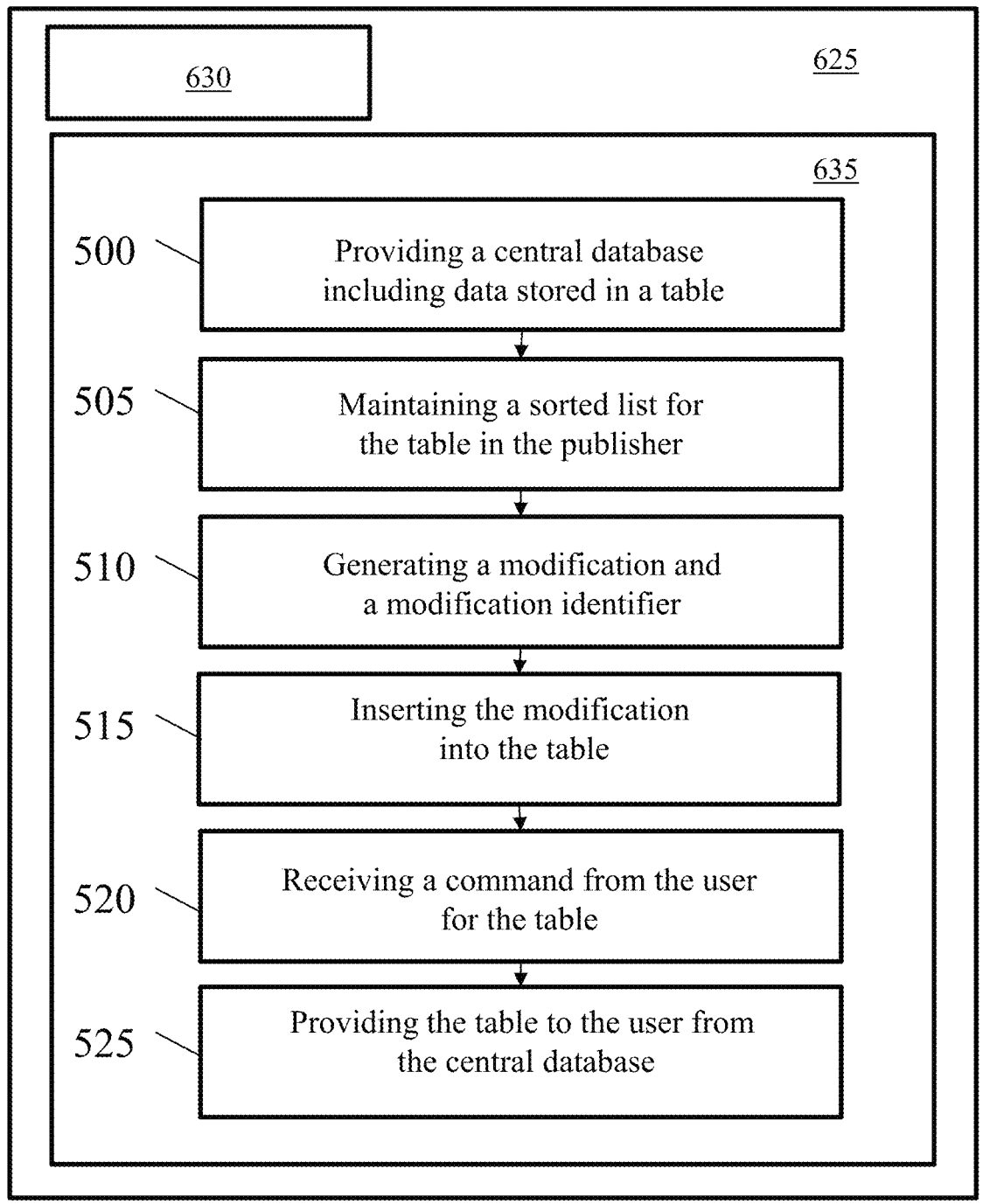
FIG. 6 is an example computing device with a hardware processor and accessible machine-readable instructions in accordance with one or more example embodiments.

Turning to FIG. 6, an example computing device with a hardware processor and accessible machine-readable instructions is shown in accordance with one or more example embodiments. FIG. 6 provides is an example computing device 625, with a hardware processor 630, and accessible machine-readable instructions stored on a machine-readable medium 635 for performing the remote monitoring discussed above with respect to one or more disclosed example implementations. FIG. 6 illustrates computing device 625 configured to perform the flow described in blocks 500, 505, 510, 515, and 520, discussed in detail with respect to FIG. 5. However, computing device 625 may also be configured to perform the flow of other methods, techniques, functions, or processes described in this disclosure.

A machine-readable storage medium, such as 635 of FIG. 6, may include both volatile and nonvolatile, removable and non-removable media, and may be any electronic, magnetic, optical, or other physical storage device that contains or stores executable instructions, data structures, program module, or other data accessible to a processor, for example firmware, erasable programmable read-only memory ("EPROM"), random access memory ("RAM"), non-volatile random access memory ("NVRAM"), optical disk, solid state drive ("SSD"), flash memory chips, and the like. The machine-readable storage medium may be a non-transitory storage medium, where the term "non-transitory" does not encompass transitory propagating signals.

Figure 7:
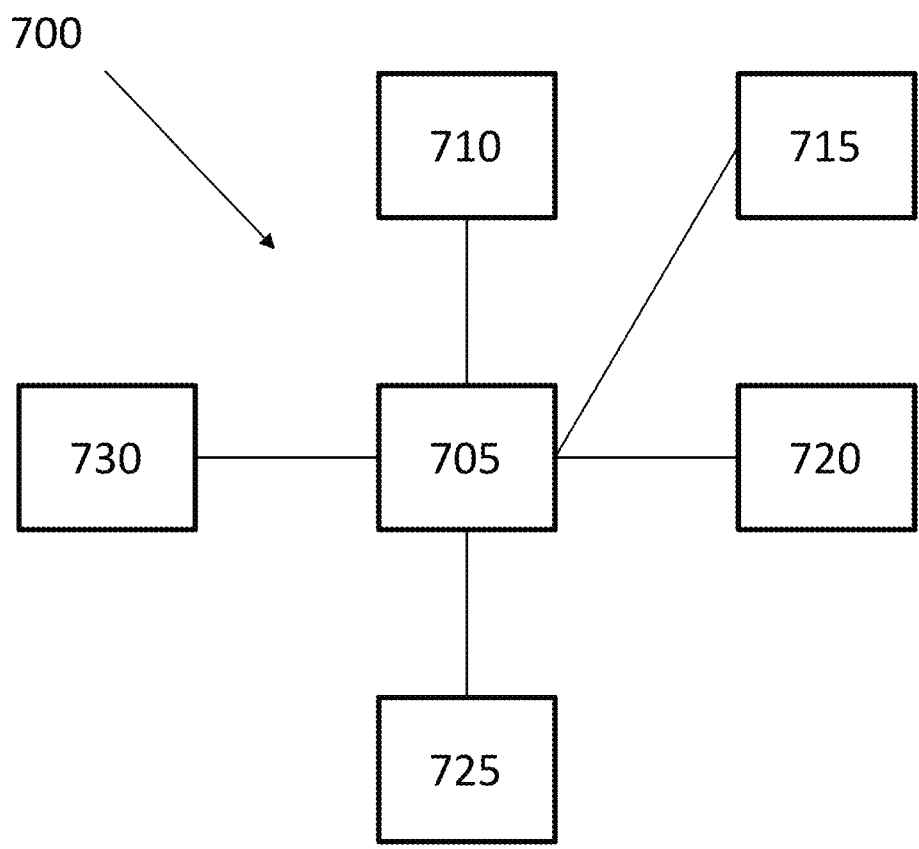
FIG. 7 is a schematic representation of a computer processing device that may be used to implement functions and processes in accordance with one or more example embodiments.

Turning to FIG. 7, a schematic representation of a computer processing device 700 that may be used to implement functions and processes in accordance with one or more example embodiments is shown. FIG. 7 illustrates a computer processing device 700 that may be used to implement the systems, methods, and processes of this disclosure. For example, computing device 700 illustrated in FIG. 7 could represent a client device or a physical server device and include either hardware or virtual processor(s) depending on the level of abstraction of the computing device. In some instances (without abstraction), computing device 700 and its elements, as shown in FIG. 7, each relate to physical hardware. Alternatively, in some instances one, more, or all of the elements could be implemented using emulators or virtual machines as levels of abstraction. In any case, no matter how many levels of abstraction away from the physical hardware, computing device 700 at its lowest level may be implemented on physical hardware. In one implementation, computing device 700 may allow a subscriber to remotely access one or more data centers. Similarly, the management tool used by the subscriber may include a software solution that runs on such a computing device 700.

As also shown in FIG. 7, computing device 700 may include one or more input devices 730, such as a keyboard, mouse, touchpad, or sensor readout (e.g., biometric scanner) and one or more output devices 715, such as displays, speakers for audio, or printers. Some devices may be configured as input/output devices also (e.g., a network interface or touchscreen display).

Computing device 700 may also include communications interfaces 725, such as a network communication unit that could include a wired communication component and/or a wireless communications component, which may be communicatively coupled to processor 705. The network communication unit may utilize any of a variety of proprietary or standardized network protocols, such as Ethernet, TCP/IP, to name a few of many protocols, to effect communications between devices. Network communication units may also comprise one or more transceiver(s) that utilize the Ethernet, power line communication ("PLC"), WiFi, cellular, and/or other communication methods. This communications interface 725 may thereby allow the subscriber to communicate with the data center remotely. Such computing devices 725 may be, either in totality or as a component feature, the network devices discussed in FIG. 1, Computing devices 725 may also be used by the clients/subscribers that are discussed above to submit commands to network devices.

Computing device 700 includes a processing element such as processor 705 that contains one or more hardware processors, where each hardware processor may have a single or multiple processor cores. In one embodiment, the processor 705 may include at least one shared cache that stores data (e.g., computing instructions) that are utilized by one or more other components of processor 705. For example, the shared cache may be a locally cached data stored in a memory for faster access by components of the processing elements that make up processor 705. In one or more embodiments, the shared cache may include one or more mid-level caches, such as level 2 ("L2"), level 3 ("L3"), level 4 ("L4"), or other levels of cache, a last level cache ("LLC"), or combinations thereof. Examples of processors include but are not limited to a central processing unit ("CPU") a microprocessor. Although not illustrated in FIG. 7, the processing elements that make up processor 705 may also include one or more of other types of hardware processing components, such as graphics processing units ("GPU"), application specific integrated circuits ("ASICs"), field-programmable gate arrays ("FPGAs"), and/or digital signal processors ("DSPs").

FIG. 7 illustrates that memory 710 may be operatively and communicatively coupled to processor 710. Memory 710 may be a non-transitory medium configured to store various types of data. For example, memory 710 may include one or more storage devices 720 that comprise a non-volatile storage device and/or volatile memory. Volatile memory, such as random-access memory ("RAM"), can be any suitable non-permanent storage device. The non-volatile storage devices 720 can include one or more disk drives, optical drives, solid-state drives ("SSDs"), tap drives, flash memory, read only memory ("ROM"), and/or any other type of memory designed to maintain data for a duration of time after a power loss or shut down operation. In certain instances, the non-volatile storage devices 720 may be used to store overflow data if allocated RAM is not large enough to hold all working data. The non-volatile storage devices 720 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 705. In one embodiment, the compiling process of the software program may transform program code written in a programming language to another computer language such that the processor 705 is able to execute the programming code. For example, the compiling process of the software program may generate an executable program that provides encoded instructions (e.g., machine code instructions) for processor 705 to accomplish specific, non-generic, particular computing functions.

After the compiling process, the encoded instructions may then be loaded as computer executable instructions or process steps to processor 705 from storage device 720, from memory 710, and/or embedded within processor 705 (e.g., via a cache or on-board ROM). Processor 705 may be configured to execute the stored instructions or process steps in order to perform instructions or process steps to transform the computing device into a non-generic, particular, specially programmed machine or apparatus. Stored data, e.g., data stored by a storage device 720, may be accessed by processor 705 during the execution of computer executable instructions or process steps to instruct one or more components within the computing device 700.

A subscriber interface (e.g., output, devices 715 and input devices 730) can include a display, positional input device (such as a mouse, touchpad, touchscreen, or the like), keyboard, or other forms of subscriber input and output devices. The subscriber interface components may be communicatively coupled to processor 705. When the output device is or includes a display, the display can be implemented in various ways, including by a liquid crystal display ("LCD") or a cathode-ray tube ("CRT") or light emitting diode ("LED") display, such as an organic light emitting diode ("OLED") display. Persons of ordinary skill in the art having the benefit of this disclosure will be aware that the computing device 700 may comprise other components well known in the art, such as sensors, powers sources, and/or analog-to-digital converters, not explicitly shown in FIG. 7.

It should be appreciated that all combinations of the foregoing concepts (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that, terminology explicitly employed herein that also may appear in any disclosure incorporated by reference should be accorded a meaning most consistent with the particular concepts disclosed herein.

While the present teachings have been described in conjunction with various examples, it is not intended that the present teachings be limited to such examples. The above-described examples may be implemented in any of numerous ways.

Also, the technology described herein may be embodied as a method, of which at least one example has been provided. The acts performed as part of the method may be ordered in any suitable way. Accordingly, examples may be constructed in which acts are performed in an order different than illustrated, which may include performing some acts simultaneously, even though shown as sequential acts in illustrative examples.

Advantages of one or more example embodiments may include one or more of the following:

In one or more examples, systems and methods disclosed herein may be used to decrease system resource requirements when providing network device data to subscribers.

In one or more examples, systems and methods disclosed herein may be used to decrease the number of sort functions performed for network devices.

In one or more examples, systems and methods disclosed herein may be used to more efficiently transfer data about network devices to subscribers.

In one or more examples, systems and methods disclosed herein may be used to provide data stored in tables in the correct positional location to subscribers.

Not all embodiments will necessarily manifest all these advantages. To the extent that various embodiments may manifest one or more of these advantages, not all of them will do so to the same degree.

While the claimed subject matter has been described with respect to the above-noted embodiments, those skilled in the art, having the benefit of this disclosure, will recognize that other embodiments may be devised that are within the scope of claims below as illustrated by the example embodiments disclosed herein. Accordingly, the scope of the protection sought should be limited only by the appended claims.

What is claimed is:

1. A method of providing data stored in a network device to a subscriber, the method comprising:
   maintaining, by the network device, a central database which stores, in a table, data comprising at least statistics related to the network device as a switching device, routing table information, and overall network connectivity information about the network device;
   maintaining a first local sorted list for the table in a first publisher, and a second local sorted list for the table in a second publisher,
   wherein a respective sorted list provides a respective publisher with location information on how specific rows, columns, and boxes of the table stored in the central database are located relative to each other;
   generating, based on the location information in the first sorted local list, a first modification and a first modification identifier for the table at the first publisher, wherein the first modification identifier identifies a first location within the table to insert the first modification;
   generating, based on the location information in the second local sorted list, a second modification and a second modification identifier for the table at the second publisher, wherein the second modification identifier identifies a second location within the table to insert the second modification;
   inserting, by the network device, the first modification into the table in the central database based on the first modification identifier and the second modification into the table in the central database based on the second modification identifier to obtain a sorted table,
   wherein the first modification and the second modification are generated independently at the first publisher and the second publisher, which allows multiple publishers to work together while inserting the first modification and the second modification into the table;
   responsive to any publisher of the multiple publishers generating any modification, updating continuously and in real-time the table comprising the information about the network device by inserting a respective modification into a respective correct location in the table;
   responsive to the network device receiving a command from the subscriber for the sorted table, providing, by the network device from the central database to the subscriber, the sorted table which includes the previously inserted first modification and second modification without referring to the first sorted local list and the second sorted local list, which allows the subscriber to use the sorted table while bypassing sorting the table prior to use; and
   performing, based on the continuously and in real-time updated sorted table, remote monitoring of the network device and a plurality of network communication devices by real time monitoring for troubleshooting or fault analysis.

2. The method of claim 1, further comprising:
   receiving a second command from a second subscriber for the sorted table; and
   providing, by the network device from the central database to the second subscriber, the sorted table which includes the previously inserted first modification and second modification without referring to the first sorted local list and the second sorted local list.

3. The method of claim 1, wherein the command comprises a show command.

4. The method of claim 1, wherein the command comprises a configure command.

5. The method of claim 1, wherein the table comprises a selected portion of the data within the table.

6. A non-transitory computer readable medium comprising computer executable instructions stored thereon that when executed by one or more processing units perform a method to provide data stored in a network device to a subscriber, the method comprising:
   maintaining a central database which stores, in a table, data comprising at least statistics related to the network device as a switching device, routing table information, and overall network connectivity information about the network device;
   maintaining a first local sorted list for the table in a first publisher and a second local sorted list for the table in a second publisher,
   wherein a respective sorted list provides a respective publisher with location information on how specific rows, columns, and boxes of the table stored in the central database are located relative to each other;
   generating, based on the location information in the first local sorted list, a first modification and a first modification identifier for the table at the first publisher, wherein the first modification identifier identifies a first location within the table to insert the first modification;
   generating, based on the location information in the second local sorted list, a second modification and a second modification identifier for the table at the second publisher, wherein the second modification identifier identifies a second location within the table to insert the second modification;
   inserting the first modification into the table in the central database based on the first modification identifier and the second modification into the table in the central database based on the second modification identifier to obtain a sorted table,
   wherein the first modification and the second modification are generated independently at the first publisher and the second publisher, which allows multiple publishers to work together while inserting the first modification and the second modification into the table;

responsive to any publisher of the multiple publishers generating any modification, updating continuously and in real-time the table comprising the information about the network device by inserting a respective modification into a respective correct location in the table;

responsive to receiving a command from the subscriber for the sorted table, providing, to the subscriber from the central database, the sorted table which includes the previously inserted first modification and second modification without referring to the first sorted local list and the second sorted local list, which allows the subscriber to use the sorted table while bypassing sorting the table prior to use; and performing, based on the continuously and in real-time updated sorted table, remote monitoring of the network device and a plurality of network communication devices by real time monitoring for troubleshooting or fault analysis.

7. The non-transitory computer readable medium of claim 6, further comprising:

receiving a second command from a second subscriber for the sorted table; and providing, to the second subscriber from the central database, the sorted table which includes the previously inserted first modification and second modification without referring to the first sorted local list and the second sorted local list.

8. The non-transitory computer readable medium of claim 6, wherein the command comprises a show command.

9. The non-transitory computer readable medium of claim 6, wherein the command comprises a configure command.

10. The method of claim 1, further comprising performing a remote fault analysis of the remotely monitored network device and network communication devices.

11. The method of claim 1, wherein performing the remote monitoring further comprises:

passive monitoring, by accumulating data over time to facilitate monitoring of performance and use information.

12. The method of claim 1, wherein the maintained data comprising information about the network device includes one or more of:

an overall device state at a given point in time;
protocols for network layers;
information associated with processes; and
functionality data.

13. The method of claim 1, wherein the table includes rows and columns, wherein the columns include a specific class of information and wherein a corresponding row includes data related to the specific class of information.

14. The method of claim 1, wherein the table comprises a linked-list data structure.

15. The method of claim 2, wherein the second command from the second subscriber comprises a request for access to a set of rows associated with one or more columns of the table; and wherein providing the table to the second subscriber from the central database comprises providing the requested set of rows associated with the one or more columns of the table, which allows the second user to use the requested set of rows without performing a sort function on the table.

16. The non-transitory computer readable medium of claim 6, wherein the method further comprises:

performing, based on the sorted table, remote monitoring of the network device and a plurality of network communication devices; and performing a remote fault analysis of the remotely monitored network device and network communication devices.

17. The non-transitory computer readable medium of claim 16, wherein performing the remote monitoring comprises one or more of:

real time monitoring for troubleshooting or fault analysis; and passive monitoring, by accumulating data over time to facilitate monitoring of performance and use information.

18. The non-transitory computer readable medium of claim 6, wherein the table includes rows and columns, wherein the columns include a specific class of information and wherein a corresponding row includes data related to the specific class of information.

19. The non-transitory computer readable medium of claim 7, wherein the second command from the second subscriber comprises a request for access to a set of rows associated with one or more columns of the table; and wherein providing the table to the second subscriber from the central database comprises providing the requested set of rows associated with the one or more columns of the table, which allows the second user to use the requested set of rows without performing a sort function on the table.

* * * * *